C. M. WARREN.
ROOFING-TILES.

No. 175,533. Patented March 28. 1876.

Witnesses.
Otto Hufeland
Chas. Wahlers.

Inventor.
Cyrus M Warren
by Van Santvoord & Hauff
his attys

UNITED STATES PATENT OFFICE.

CYRUS M. WARREN, OF BROOKLINE, MASSACHUSETTS.

IMPROVEMENT IN ROOFING-TILES.

Specification forming part of Letters Patent No. 175,533, dated March 28, 1876; application filed October 7, 1875.

*To all whom it may concern:*

Be it known that I, CYRUS M. WARREN, of Brookline, in the county of Norfolk and State of Massachusetts, have invented a new and Improved Tile for Roofs, and other purposes, which invention is fully set forth in the following specification, reference being had to the accompanying drawing, in which—

Figure 1:
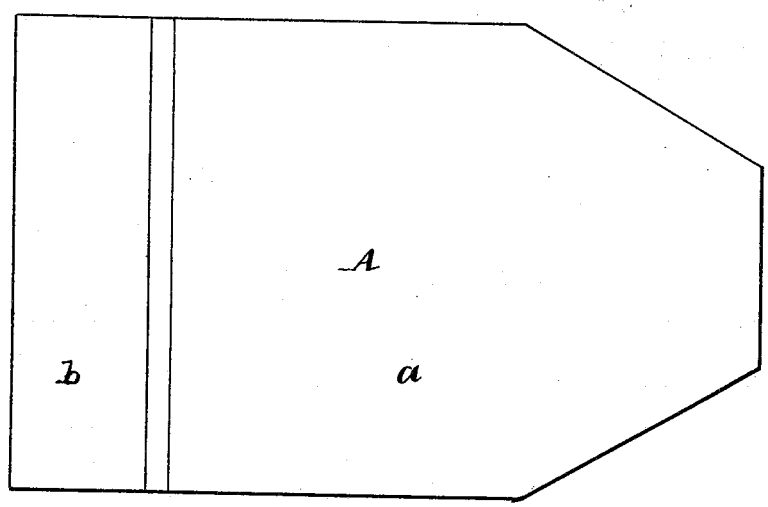
Figure 2:

Figure 1 represents a longitudinal section. Fig. 2 is a plan or top view.

Similar letters indicate corresponding parts.

This invention consists in a tile for roofs and other purposes made of hydraulic cement, with a lining of water-proof felt, or other equivalent material, and an intervening layer of pitch, or other equivalent material, which is spread over the felt, so that when the cement, after having been spread or poured, has set, and heat is applied, the intervening layer of pitch forms a binding material between the felt and the cement, and a tile is obtained which is water-proof and of superior durability.

In the drawing, the letter A designates my tile, which is composed of a layer, *a*, of cement, and intervening layer *b* of pitch, bitumen, or other equivalent material, and a lining, *c*, of felt, or other equivalent flexible material. This flexible lining is rendered water-proof by the layer *b* of pitch, bitumen, or other equivalent material which is spread on it, or it may be rendered water-proof by any other suitable means, and the pitch or bitumen spread over it afterward. After the felt or other flexible material has been covered with the layer *b* of pitch I cut the same in pieces of suitable size, which I place in a mold, and then I apply the layer *a* of hydraulic cement. After the cement has set I expose the whole to a sufficient heat to melt the pitch, and thereby the cement and the felt, or other flexible material, are firmly united.

The great advantages of my tile are: First, that the same can be made cheap, and that it can be molded in any desirable form or shape; second, that when the cement is broken or cracked the pieces are firmly retained in position by the flexible material, and no water is permitted to penetrate; furthermore, if my tile is used for roofing, and the cement becomes cracked from any cause, the pieces are not liable to fall off or be blown off by the wind, and injury to passers-by is avoided. At the same time, even if the cement has cracked, the roof does not become leaky; third, my tile can be used with advantage for roofing, for floors, for sidewalks, and other purposes of a similar nature.

What I claim as new, and desire to secure by Letters Patent, is—

A tile for roofing and other purposes made of a layer of hydraulic cement, an intervening layer of pitch, or other equivalent material, and a lining of felt, or other flexible material, all combined substantially in the manner shown and described.

In testimony that I claim the foregoing I have hereunto set my hand and seal.

C. M. WARREN. [L. S.]

Witnesses:
 MOSES WITHINGTON,
 WILLARD Y. GROSS.